US012434707B2

United States Patent
Ito (10) Patent No.: US 12,434,707 B2
(45) Date of Patent: Oct. 7, 2025

(54) DRIVING SUPPORT DEVICE, DRIVING SUPPORT METHOD, AND STORAGE MEDIUM THAT STORES DRIVING SUPPORT PROGRAM

(71) Applicant: TOYOTA JIDOSHA KABUSHIKI KAISHA, Toyota (JP)

(72) Inventor: Yuma Ito, Obu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 105 days.

(21) Appl. No.: 18/410,005

(22) Filed: Jan. 11, 2024

(65) Prior Publication Data

US 2024/0270255 A1 Aug. 15, 2024

(30) Foreign Application Priority Data

Feb. 10, 2023 (JP) ................................. 2023-019081

(51) Int. Cl.
*B60W 30/17* (2020.01)
*B60W 30/165* (2020.01)
(Continued)

(52) U.S. Cl.
CPC ........ *B60W 30/182* (2013.01); *B60W 30/165* (2013.01); *B60W 30/18018* (2013.01); *B60W 40/08* (2013.01); *B60W 50/14* (2013.01); *G06V 20/58* (2022.01); *G06V 20/597* (2022.01); *B60W 2040/0818* (2013.01); *B60W 2420/403* (2013.01); *B60W 2540/106* (2013.01);
(Continued)

(58) Field of Classification Search
CPC ................. B60W 30/16; B60W 50/14; B60W 2540/225; B60W 2540/10; B60W 2540/229; B60W 50/082; B60W 60/0059
See application file for complete search history.

(56) References Cited

U.S. PATENT DOCUMENTS 8,355,851 B2   1/2013   Inoue et al.
8,370,040 B2   2/2013   Inoue et al.
(Continued)

FOREIGN PATENT DOCUMENTS

JP   4962137 82    6/2012
JP   2013-123993 A  6/2013
(Continued)

*Primary Examiner* — Kenneth J Malkowski
(74) *Attorney, Agent, or Firm* — SoraIP, Inc.

(57) ABSTRACT

The processor of the driving support device satisfies the second condition for determining that the driver of the own vehicle was paying attention to the area in front of the own vehicle at the time the first condition for determining that the preceding vehicle has started is satisfied. If not, the notification device is controlled to present predetermined first information to the driver, and after presenting the first information, the switch device is operated without the second condition being satisfied. If it is detected that the notification device has been activated, the notification device is controlled to present second information to the driver, and after presenting the second information, the switch device is operated without the second condition being satisfied. When it is detected that the host vehicle has been moved, the host vehicle is controlled so that the host vehicle starts in a predetermined first mode.

5 Claims, 3 Drawing Sheets

(51) Int. Cl.
   *B60W 30/18*  (2012.01)
   *B60W 30/182*  (2020.01)
   *B60W 40/08*  (2012.01)
   *B60W 50/14*  (2020.01)
   *G06V 20/58*  (2022.01)
   *G06V 20/59*  (2022.01)
(52) U.S. Cl.
   CPC ............... *B60W 2540/229* (2020.02); *B60W 2554/4046* (2020.02)

(56) References Cited

U.S. PATENT DOCUMENTS

| | | | |
|---|---|---|---|
| 8,417,430 | B2 | 4/2013 | Saeki |
| 8,548,709 | B2 | 10/2013 | Morita |
| 8,768,597 | B2 | 7/2014 | Kagawa |
| 9,174,643 | B2 | 11/2015 | Aso |
| 10,017,178 | B2 | 7/2018 | Morimoto et al. |
| 10,118,617 | B2 | 11/2018 | Urano et al. |
| 10,486,698 | B2 | 11/2019 | Masui et al. |
| 2002/0055808 | A1* | 5/2002 | Matsumoto .......... G01C 21/365 348/148 |
| 2007/0213914 | A1* | 9/2007 | Etori ................... B60W 50/085 180/170 |
| 2017/0259821 | A1* | 9/2017 | Nakadori .............. B60W 50/14 |
| 2019/0295419 | A1 | 9/2019 | Tosa et al. |
| 2021/0081690 | A1* | 3/2021 | Inagaki ................ G06V 40/161 |

FOREIGN PATENT DOCUMENTS

| | | |
|---|---|---|
| JP | 5494560 B2 | 5/2014 |
| JP | 6436116 B2 | 12/2018 |
| JP | 6493255 B2 | 4/2019 |
| JP | 2021-170232 A | 10/2021 |
| JP | 7095330 B2 | 7/2022 |

\* cited by examiner

DRIVING SUPPORT DEVICE, DRIVING SUPPORT METHOD, AND STORAGE MEDIUM THAT STORES DRIVING SUPPORT PROGRAM

CROSS-REFERENCE TO RELATED APPLICATION

This application claims priority to Japanese Patent Application No. 2023-019081 filed on Feb. 10, 2023, incorporated herein by reference in its entirety.

BACKGROUND

1. Technical Field

The present disclosure relates to a driving support device, a driving support method, and a storage medium that stores a driving support program that control a drive device etc. of an own vehicle so that the own vehicle follows a preceding vehicle (another vehicle traveling right in front of the own vehicle).

2. Description of Related Art

A driving support device has been proposed that starts the own vehicle so that the own vehicle follows the preceding vehicle when the preceding vehicle starts in a situation where the preceding vehicle and the own vehicle are stopped (for example, refer to the following Japanese Patent No. 4962137 (JP 4962137 B)). The driving support device of JP 4962137 B (hereinafter referred to as the "conventional device") controls the drive device etc. of the own vehicle so that the own vehicle starts by following the preceding vehicle, when operation of a predetermined switch is detected in a state where a driver of the own vehicle pays attention to forward of the own vehicle after a first time point when start of the preceding vehicle was detected. The conventional device does not start the own vehicle when operation of the switch is detected in a state where the driver of the own vehicle does not pay attention to forward of the own vehicle after the first time point. Note that the conventional device starts the own vehicle when the driver of the own vehicle depresses an accelerator pedal without paying attention to forward of the own vehicle after the first time point.

SUMMARY

As described above, according to the conventional device, in a situation where the driver is not paying attention to the front, starting the own vehicle by switch operation is prohibited. Incidentally, there is a possibility that the detection precision (accuracy) of the direction to which the driver is paying attention may be reduced when there is a defect in the conventional device (the sensor included in the conventional device), or at night, for example. In this case, a situation may occur in which the own vehicle does not start (the conventional device does not start the own vehicle) even when the driver operates the switch while paying attention to the front.

An object of the present disclosure is to provide a driving support device that is able to start the own vehicle using switch operation as a trigger even when the detection precision of a driver sensor that detects the direction to which the driver pays attention is reduced.

In order to achieve the above object, a driving support device (1) of the present disclosure includes a forward sensor (21, 22, 23) that acquires information related to behavior of a preceding vehicle, an operation sensor (27, 28) that acquires information related to an operation mode of an operation device of an own vehicle, a driver sensor (24) that acquires information related to a direction to which a driver of the own vehicle is paying attention, and a processor (10) that controls the own vehicle so as to start the own vehicle in a predetermined mode when a predetermined first condition (vr>vrth, D>Dth) to determine that the preceding vehicle has started is satisfied and operation of the operation device is detected, in a situation where the preceding vehicle has stopped and the own vehicle has stopped right behind the preceding vehicle. The operation sensor includes a switch device (27), and the processor is configured to control a predetermined notification device (50) and present predetermined first information to the driver, when a second condition to determine that the driver of the own vehicle was paying attention to an area forward of the own vehicle is not satisfied at a first time point (t1) when the first condition is satisfied, control the notification device and present second information to the driver, when operation of the switch device is detected without the second condition being satisfied after presenting the first information, and control the own vehicle so as to start the own vehicle in a predetermined first mode, when operation of the switch device is detected without the second condition being satisfied after presenting the second information.

Normally, when the driving support device presents the first information and further presents the second information, there is a high possibility that the driver will pay attention to the front (the second condition will be satisfied). Therefore, when the second condition is not satisfied even when the first information and the second information have been presented, the driving support device estimates that the detection precision of the driver sensor is reduced. Further, when the driving support device detects that the switch device has been operated after presenting the second information, the driving support device estimates that the driver intends to start the own vehicle, and starts the own vehicle. In this way, the driving support device starts the own vehicle using the switch operation (second operation) as a trigger, after executing attention calling to the driver in two different modes (presenting the first information and the second information). Therefore, compared to the case where the driving support device starts the own vehicle using the switch operation (first operation) as a trigger after executing one attention calling (presenting the first information), the estimation precision of the intention of the driver to start the own vehicle is high. According to the driving support device of the present disclosure, it is possible to start the own vehicle using switch operation as a trigger even when the detection precision of the driver sensor is reduced.

In a driving support device according to an aspect of the present disclosure, the operation sensor includes an accelerator pedal sensor (28) that detects depth of depression (AD) of an accelerator pedal (AP), and the processor is configured to control the own vehicle so as to start the own vehicle in a predetermined second mode, when operation of the accelerator pedal is detected after presenting the first information to the driver.

It is highly likely that the operation of the accelerator pedal clearly reflects the intention of the driver to start the own vehicle. Therefore, according to the present disclosure, it is possible to start the own vehicle according to the intention of the driver.

In a driving support device according to another aspect of the present disclosure, an attention calling level to the driver by presentation of the second information is higher than an attention calling level to the driver by presentation of the first information.

Accordingly, it is possible to improve the estimation precision of the intention of the driver to start the own vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a plan view showing the direction (angle θ) that the driver is paying attention to.

DETAILED DESCRIPTION OF EMBODIMENTS

Outline

A driving support device 1 according to an embodiment of the present disclosure is applied, for example, to a vehicle V (hereinafter referred to as "own vehicle") equipped with an automatic driving function. In a situation where the preceding vehicle PV has stopped and the own vehicle has stopped immediately after that, the driving support device 1 performs the following operation when a predetermined condition is satisfied after the point in time when it is detected that the preceding vehicle PV has started. It has a function (following start function) of controlling the drive device of the own vehicle so that the own vehicle starts following the preceding vehicle PV.

Specific Configuration

Figure 1:
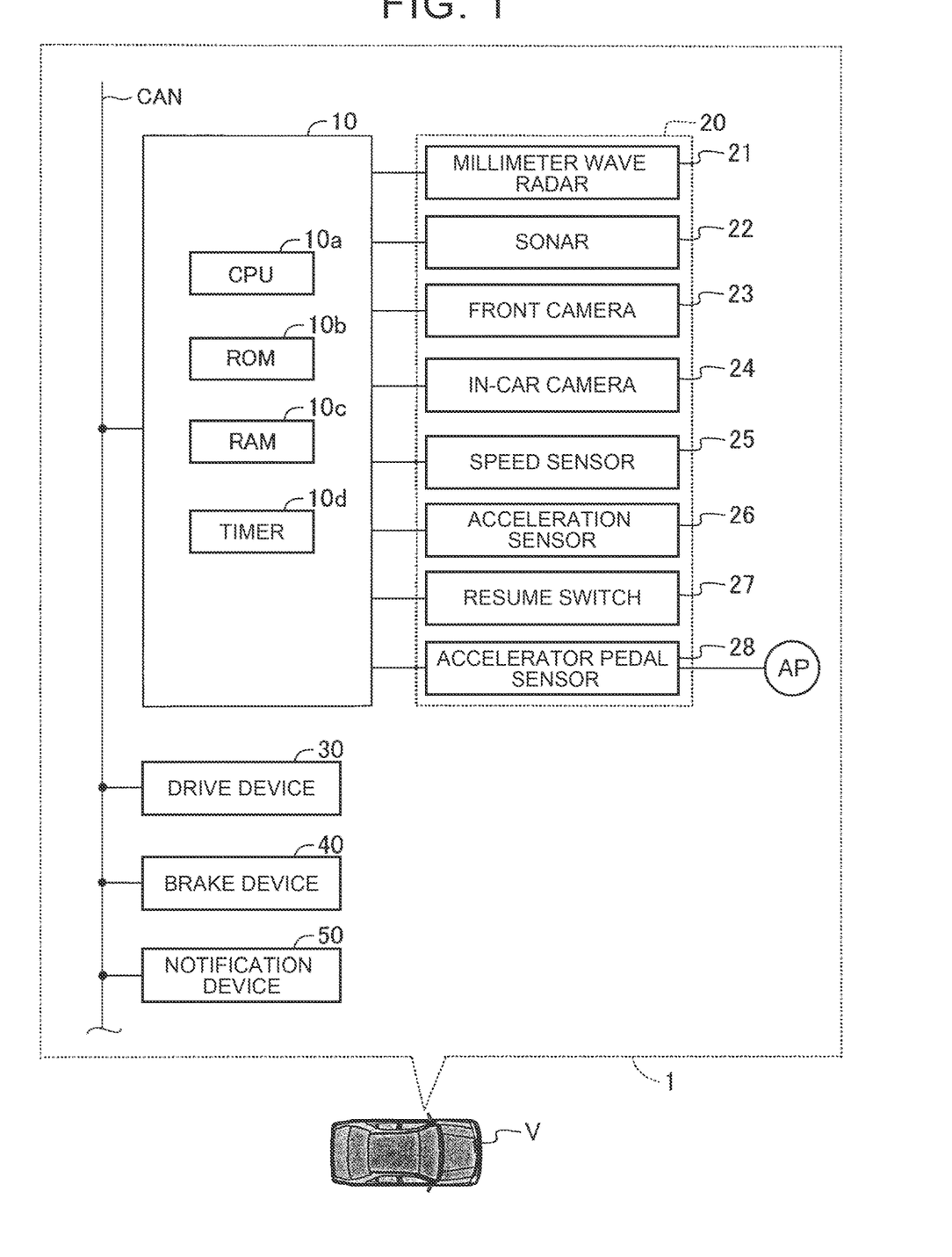
FIG. 1 is a block diagram of a traction determination device according to an embodiment of the present disclosure.

As shown in FIG. 1, the driving support device 1 includes a driving support ECU 10, an in-vehicle sensor 20, a drive device 30, a braking device 40, and a notification device 50. The driving support ECU 10 includes a microcomputer equipped with a CPU 10*a*, a ROM 10*b*, a RAM 10*c*, a timer 10*d*, and the like. The driving support ECU 10 is connected to other ECUs included in the own vehicle via a Controller Area Network (CAN).

The in-vehicle sensor 20 includes a forward sensor that acquires information regarding the preceding vehicle PV. Specifically, the in-vehicle sensor 20 includes a millimeter wave radar 21, a sonar 22, and a front camera 23 as forward sensors.

The millimeter wave radar 21 includes a transmitting/receiving section and a signal processing section (not shown). The transmitter/receiver unit emits radio waves in the millimeter wave band (hereinafter referred to as "millimeter waves") to the front of the own vehicle, and receives the millimeter waves (reflected waves) reflected by a three-dimensional object (preceding vehicle PV) disposed in the emitting range. The signal processing unit calculates the distance between the own vehicle and the three-dimensional object, the speed of the three-dimensional object, etc. based on the time from the transmitter/receiver unit emits the millimeter wave until the transmitter/receiver unit receives the reflected wave, the phase difference between the transmitted millimeter wave and the received reflected wave, and the attenuation level of the reflected wave, etc., and the calculation results are transmitted to the driving support ECU 10.

The sonar 22 intermittently emits ultrasonic waves to the surrounding area of the own vehicle and receives ultrasonic waves (reflected waves) reflected by three-dimensional objects. The sonar 22 calculates the distance between the own vehicle and the three-dimensional object, the relative position (direction) of the three-dimensional object with respect to the own vehicle, etc. based on the time from transmitting the ultrasonic wave to receiving the reflected wave, and the calculation results are sent to the driving support ECU 10.

The front camera 23 includes an imaging device and an image analysis device. The imaging device is, for example, a digital camera incorporating a charge coupled device (CCD) or a CMOS image sensor (CIS) imaging element. The imaging device is directed forward at the top of the front windshield glass. The imaging device captures the foreground of the own vehicle at a predetermined frame rate to obtain image data. The imaging device transmits image data to an image analysis device. The image analysis device analyzes the acquired image data and acquires information about an object located in front of the own vehicle from the image. For example, the image analysis device identifies (recognizes) the type of object located in front of the own vehicle (for example, another vehicle, a guardrail, etc.), and transmits the identification result to the driving support ECU 10.

Furthermore, the in-vehicle sensor 20 includes a driver sensor (driver monitor) that acquires information regarding the driver's condition (the direction in which the driver is paying attention). Specifically, the in-vehicle sensor 20 includes an in-vehicle camera 24 as a driver sensor.

Figure 2:
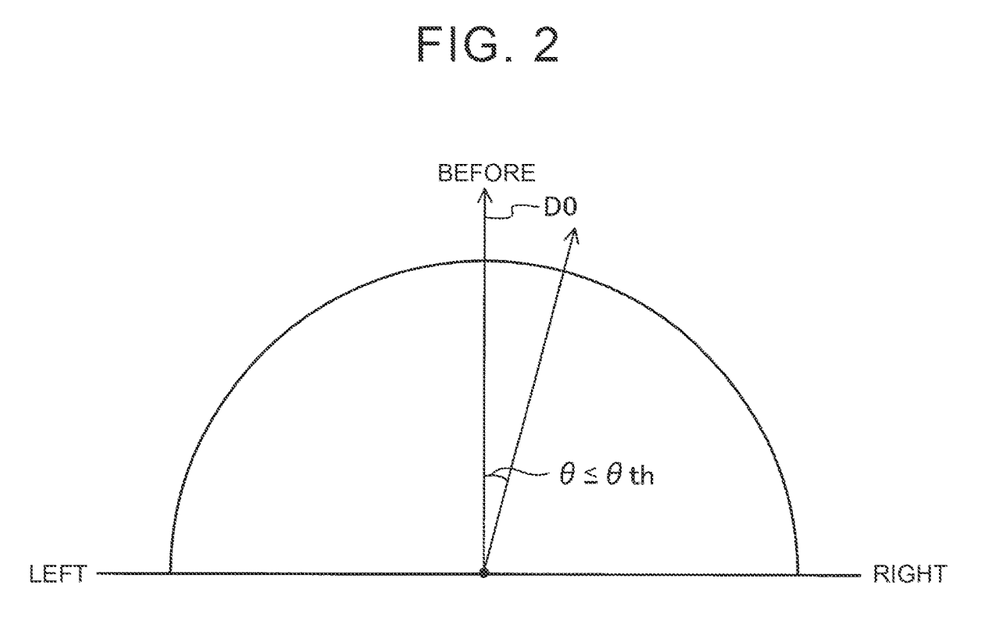

Like the front camera 23, the in-vehicle camera 24 includes an imaging device and an image analysis device. The imaging device is installed, for example, in the dashboard (instrument panel) of the own vehicle and is directed toward the driver's seat. The imaging device outputs image data obtained by photographing the driver at a predetermined frame rate to the image analysis device. The image analysis device analyzes the acquired image data. The image analysis device calculates the direction the driver is paying attention to (for example, the angle θ with respect to the front-rear direction D0 of the own vehicle in plan view, as shown in FIG. 2) based on the driver's face direction, eyeball direction, etc. from the image. The image analysis device transmits the calculation result (angle θ) to the driving support ECU 10.

In addition, the in-vehicle sensor 20 includes a vehicle sensor that acquires information regarding the driving state of the own vehicle. Specifically, the in-vehicle sensor 20 includes a speed sensor 25 and an acceleration sensor 26 as vehicle sensors.

The speed sensor 25 detects the rotational speed (wheel speed) of each wheel. The speed sensor 25 calculates the speed vs (actual vehicle speed) of the own vehicle based on the wheel speed of each wheel. Speed sensor 25 transmits data representing speed vs to driving support ECU 10.

The acceleration sensor 26 detects the acceleration α of the own vehicle in the longitudinal direction. Acceleration sensor 26 transmits data representing acceleration α to driving support ECU 10. Further, the acceleration sensor 26 calculates jerk J (jerk) based on time series data of acceleration α. The acceleration sensor 26 transmits data representing jerk J to the driving support ECU 10.

Further, the in-vehicle sensor 20 includes a resume switch 27 and an accelerator pedal sensor 28 as operation sensors.

The resume switch 27 includes a push button type switch element. The resume switch 27 is, for example, incorporated into a spoke of a steering wheel. The driving support ECU 10 monitors the on/off state of the resume switch 27.

The accelerator pedal sensor 28 detects the depression depth AD of the accelerator pedal AP of the own vehicle. The accelerator pedal sensor 28 transmits data representing the detected depression depth AD to the driving support ECU 10.

The drive device 30 applies driving force to the drive wheels. The drive device 30 includes an engine ECU, an internal combustion engine, a transmission, a drive force transmission mechanism that transmits the drive force to the wheels, and the like. The engine ECU acquires information (target value) representing the target driving force from another ECU (driving support ECU 10). Based on the acquired information, the engine ECU drives the throttle valve of the internal combustion engine to control the driving force applied to the drive wheels. The drive force generated by the internal combustion engine is transmitted to the drive wheels via the transmission and the drive force transmission mechanism.

Note that when the vehicle to which the driving support device 1 is applied is a hybrid electric vehicle (HEV), the engine ECU is configured to control the vehicle drive generated by either or both of the "internal combustion engine and the electric motor" as vehicle drive sources. Power can be controlled. Further, when the vehicle to which the driving support device 1 is applied is a battery electric vehicle (BEV), an electric motor ECU that controls the driving force of the vehicle generated by an "electric motor" as a vehicle drive source is used instead of the engine ECU. Bye.

The braking device 40 applies a braking force to the wheels (brake discs). The braking device 40 includes a brake ECU, a brake caliper, and the like. The brake caliper includes an actuator that presses a brake pad against a brake disc. The brake ECU acquires information (control signal) representing the target braking force from other ECUs. The brake ECU drives the brake caliper actuator based on the acquired information. Thus, the braking force applied to the wheels (brake discs) is controlled.

The notification device 50 includes an audio device and an image display device. The audio device reproduces a predetermined sound (chime) in response to a command transmitted from the driving support ECU 10. Further, the image display device displays a predetermined image in response to a command transmitted from the driving support ECU 10.

Operation

When the ACC switch (not shown) mounted on the own vehicle is in the on state, the driving support ECU 10 determines whether there is a preceding vehicle PV, as described below. The driving support ECU 10 controls the drive device 30 and braking device 40 (hereinafter referred to as "drive device etc.") of the own vehicle based on the determination result. This control is sometimes referred to as adaptive cruise control (ACC). ACC includes constant speed driving control and inter-vehicle distance maintenance control.

Constant Speed Driving Control

The driving support ECU 10 determines whether a preceding vehicle PV exists based on information acquired from the forward sensor. When there is no preceding vehicle PV, the driving support ECU 10 controls the drive device etc. so that the speed vs of the own vehicle matches a predetermined speed vd (for example, the speed at which the fuel consumption rate is the lowest).

Inter-Vehicle Distance Maintenance Control

When the driving support ECU 10 determines that the preceding vehicle PV is present, it acquires the inter-vehicle distance D between the preceding vehicle PV and the own vehicle and the speed v0 of the preceding vehicle PV from the forward sensor. Further, the driving support ECU 10 obtains the speed vs of the own vehicle from the speed sensor 25. The driving support ECU 10 calculates a target distance Dd of the inter-vehicle distance D based on the speed vs of the own vehicle, the speed v0 of the preceding vehicle PV, and the like.

When the speed v0 (relative speed vr=v0−vs) of the preceding vehicle PV relative to the speed vs of the own vehicle is greater than "0", the inter-vehicle distance D increases. In a state where the inter-vehicle distance D is larger than the target distance Dd, the driving support ECU 10 sets the target value of the acceleration α of the own vehicle to a predetermined value α1 so that the speed vs of the own vehicle becomes larger than the speed v0 of the preceding vehicle PV. (>0). The driving support ECU 10 then controls the drive device and the like so that the acceleration α (actually measured value) of the own vehicle matches the predetermined value α1 (acceleration control). As a result, the inter-vehicle distance D decreases and approaches the target distance Dd. Then, when the inter-vehicle distance D matches the target distance Dd, the driving support ECU 10 sets the target value of the own vehicle's acceleration α to "0". That is, the driving support ECU 10 controls the drive device and the like so that the own vehicle travels at the same speed as the preceding vehicle PV.

On the other hand, when the relative speed vr is smaller than "0", the inter-vehicle distance D decreases. In a state where the inter-vehicle distance D is smaller than the target distance Dd, the driving support ECU 10 sets the target value of the acceleration α to a predetermined value α2 (<0) so that the speed vs of the own vehicle becomes smaller than the speed v0 of the preceding vehicle PV. The driving support ECU 10 then controls the drive device and the like (deceleration control) so that the acceleration α (actually measured value) of the own vehicle matches the predetermined value α2 (<0). As a result, the inter-vehicle distance D increases and approaches the target distance Dd. Then, when the inter-vehicle distance D matches the target distance Dd, the driving support ECU 10 sets the target value of the own vehicle's acceleration α to "0".

Note that the ROM 10b stores a database representing the relationship between the speed vs, v0 and the target distance Dd, or parameters defining an arithmetic expression for calculating the target distance Dd. The driving support ECU 10 determines the target distance Dd based on the above database or calculation formula.

If the preceding vehicle PV has stopped while executing inter-vehicle distance maintenance control (v0=0 km/h), the driving support ECU 10 stops the own vehicle behind the preceding vehicle PV (vs=0 km/h). Thereafter, when the preceding vehicle PV starts, as will be explained below, the driving support ECU 10 performs a follow-up start control (follow-up start function) that controls the drive device etc. so that the own vehicle starts following the preceding vehicle PV.

Follow-Up Start Control

When the driving support ECU 10 stops the own vehicle behind the stopped preceding vehicle PV, the driving support ECU 10 measures the time Δt that has elapsed from the time point t0. Further, the driving support ECU 10 sequentially determines whether the preceding vehicle PV has started based on the information acquired from the forward sensor. For example, the driving support ECU 10 determines that the preceding vehicle PV has started when the speed v0 of the preceding vehicle PV obtained from the millimeter wave radar 21 exceeds a predetermined threshold value v0th (when the first condition is satisfied). For example, the driving support ECU 10 determines that the preceding vehicle PV has started when the distance D between the preceding vehicle PV and the own vehicle exceeds the threshold value Dth.

If the time Δt from the time t0 when the host vehicle stopped behind the preceding vehicle PV to the time t1 when it is determined that the preceding vehicle PV has started is less than or equal to the threshold value Δtth (for example, 3 seconds), the driving support ECU 10 determines that The drive device and the like are controlled so that the own vehicle starts following the preceding vehicle PV. Specifically, the driving support ECU 10 controls the drive device and the like so that the acceleration α of the own vehicle gradually increases to match the predetermined value α1. In this case, the driving support ECU 10 controls the drive device and the like so that the jerk J of the own vehicle matches the predetermined value Ja (standard value).

Further, if the time Δt from time t0 to time t1 exceeds the threshold value Δtth, the driving support ECU 10 controls the own vehicle as described below.

The driving support ECU 10 starts the own vehicle at time t1 when it is determined that the preceding vehicle PV has started, or if the driver of the own vehicle is looking ahead. Specifically, the driving support ECU 10 sequentially acquires the angle θ from the in-vehicle camera 24 in a situation where the time Δt exceeds the threshold value Δtth. When the angle θ is less than or equal to the threshold value θth, the driving support ECU 10 determines that the driver is paying attention to the road ahead. When the driving support ECU 10 determines that the driver is paying attention to the road ahead at time t1, the driving support ECU 10 controls the drive device and the like so that the own vehicle starts following the preceding vehicle PV. Specifically, the driving support ECU 10 controls the drive device and the like so that the acceleration α of the own vehicle gradually increases and reaches a predetermined value α1. In this case, the driving support ECU 10 controls the drive device and the like so that the jerk J of the own vehicle matches the predetermined value Jb.

At time t1, if the driver is not paying attention to the road ahead, the driving support ECU 10 controls the notification device 50 to present predetermined first information for urging the driver to pay attention to the road ahead. For example, the driving support ECU 10 causes the notification device 50 to play a chime, beep, etc. When the driver focuses on the road ahead due to the presentation of this first information, the driving support ECU 10 starts the own vehicle (J=Jb).

Even if the first information is presented, the driver may still not pay attention to the road ahead. Under this situation, when the driving support ECU 10 detects that the resume switch 27 has been pressed, it controls the notification device 50 to present predetermined second information to urge the driver to pay attention to the road ahead. For example, the driving support ECU 10 causes the notification device 50 to play an announcement saying "Please face forward." When the driver focuses on the road ahead due to the presentation of this second information, the driving support ECU 10 starts the own vehicle (J=Jb). Here, the first information and the second information are not limited to audio. For example, the driving support ECU 10 may cause the notification device 50 to display a predetermined image. However, the content of the audio, the volume, the content of the image, etc. are determined in advance so that the attention calling level to the driver by presenting the second information is higher than the attention calling level to the driver by presenting the first information.

When the driving support ECU 10 detects that the resume switch 27 has been pressed after presenting the second information, the driving support ECU 10 controls the drive device and the like to start the own vehicle. Specifically, the driving support ECU 10 controls the drive device and the like so that the acceleration α of the own vehicle gradually increases and reaches a predetermined value α1. In this case, the driving support ECU 10 controls the drive device and the like so that the jerk J of the own vehicle matches the predetermined value Jc.

The driving support ECU 10 also monitors the depression depth AD of the accelerator pedal AP from time t1. Based on the information acquired from the accelerator pedal sensor 28, the driving support ECU 10 starts the own vehicle when the depression depth AD of the accelerator pedal AP returning to "0" (released state) immediately after exceeding a relatively shallow threshold value (such an operation of the accelerator pedal AP is hereinafter referred to as a "start operation") is detected. That is, regardless of the direction in which the driver is paying attention (angle θ) and whether or not the resume switch 27 is pressed (change in on/off state), the driving support ECU 10 detects that the accelerator pedal AP has been operated to start. When it detects this, it starts its own vehicle.

Specifically, the driving support ECU 10 controls the drive device and the like so that the acceleration α of the host vehicle gradually increases and reaches a predetermined value α1. In this case, the driving support ECU 10 controls the drive device and the like so that the jerk J of the own vehicle matches the predetermined value Jd.

Note that the magnitude relationship of the above predetermined values Ja, Jb, Jc, and Jd does not matter. Further, if the duration of the state in which the accelerator pedal AP is depressed relatively deeply (the state in which the depression depth AD exceeds the above threshold value) exceeds the threshold value, the driving support ECU 10 determines whether the jerk J of the own vehicle is, the drive device etc. are controlled so as to match the value corresponding to the depression depth AD (accelerator override).

Note that after presenting the second information, the driving support ECU 10 may repeatedly present the second information in a situation where the driver is not paying attention to the road ahead and the driver is not operating the resume switch 27 and the accelerator pedal AP. In this case, the driving support ECU 10 uses the fact that the starting condition is satisfied (the driver's attention is directed to the road ahead, or the driver's operation of the operation device (resume switch 27 or accelerator pedal AP) as a trigger) to start the own vehicle. The presentation of the second information ends when the vehicle starts moving.

Further, the driving support ECU 10 starts the own vehicle using the establishment of the start condition as a trigger, and if the relative speed vr reaches "0" before the acceleration α of the own vehicle reaches the predetermined value α1, acceleration of the own vehicle is terminated at this point.

Figure 3:
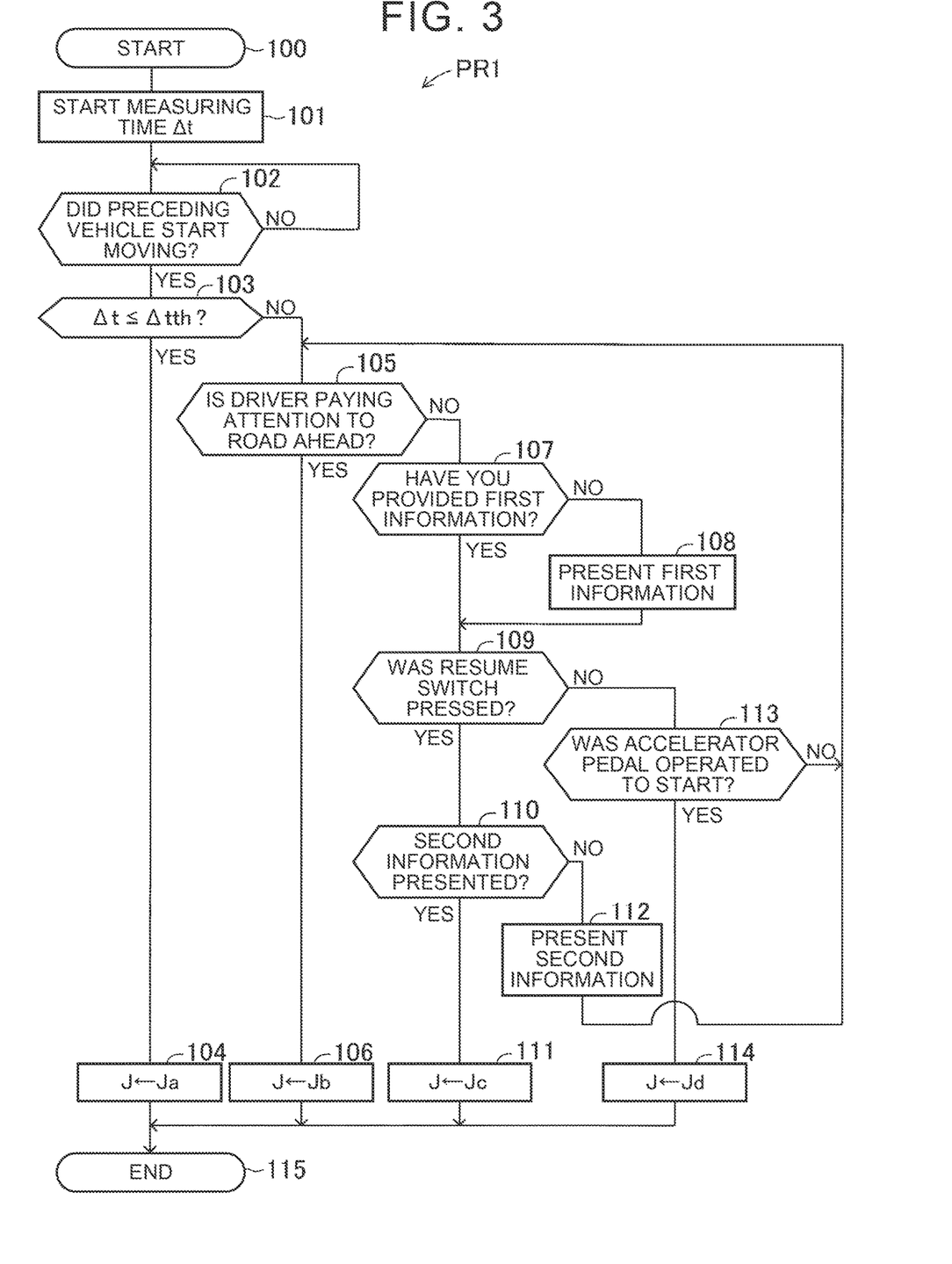
FIG. 3 is a flowchart of a program for realizing the follow-up start function.

Next, with reference to FIG. 3, a program PR1 executed by the CPU 10a (hereinafter referred to as "CPU") of the driving support ECU 10 to realize the follow-up start function will be described. The program is stored in a storage medium.

The CPU starts executing program PR1 at time t0. The CPU starts executing the program PR1 from step 100 and proceeds to step 101.

When the CPU proceeds to step 101, the CPU causes the timer 10d to start measuring the time Δt. The CPU then proceeds to step 102.

Proceeding to step 102, the CPU determines whether the preceding vehicle PV has started based on information obtained from the forward sensor (at least one of the millimeter wave radar 21, sonar 22, and front camera 23). When the CPU determines that the preceding vehicle PV has started (102: Yes), the CPU proceeds to step 103. On the other hand, if the CPU determines that the preceding vehicle PV has not started (102: No), the process returns to step 102.

When the CPU proceeds to step 103, the CPU determines whether the measured time Δt is less than or equal to the threshold value Δtth. If the time Δt is less than or equal to the threshold value Δtth (103: Yes), the CPU proceeds to step 104. On the other hand, if the time Δt exceeds the threshold value Δtth (103: No), the CPU proceeds to step 105, which will be described later.

When the CPU proceeds to step 104, the CPU controls the drive device and the like so that the own vehicle starts following the preceding vehicle PV. At this time, the CPU controls the drive device and the like so that the jerk J of the own vehicle matches the predetermined value Ja. The CPU then proceeds to step 115 and ends the execution of the program PR1.

When the CPU proceeds from step 103 to step 105, the CPU determines whether or not the driver is paying attention to the road ahead based on information acquired from the in-vehicle camera 24. If the CPU determines that the driver is paying attention to the road ahead (105: Yes), the CPU proceeds to step 106. On the other hand, if the CPU determines that the driver is not paying attention to the road ahead (105: No), the CPU proceeds to step 107, which will be described later.

When the CPU proceeds to step 106, the CPU controls the drive device and the like so that the own vehicle starts following the preceding vehicle PV. At this time, the CPU controls the drive device and the like so that the jerk J of the own vehicle matches the predetermined value Jb. The CPU then proceeds to step 115 and ends the execution of the program PR1.

When the CPU proceeds from step 105 to step 107, the CPU determines whether the first information has been presented. If the CPU determines that the first information has not been presented yet (step 107: No), the CPU proceeds to step 108. On the other hand, if the CPU determines that the first information has been presented (107: Yes), the CPU proceeds to step 109, which will be described later.

When the CPU proceeds to step 108, it controls the notification device 50 to present the first information. The CPU then proceeds to step 109.

When the CPU proceeds to step 109, it determines whether the resume switch 27 has been pressed. If the CPU determines that the resume switch 27 has been pressed (109: Yes), the CPU proceeds to step 110. On the other hand, if the CPU determines that the resume switch 27 is not pressed (109: No), the CPU proceeds to step 113, which will be described later.

When the CPU proceeds to step 110, it determines whether the second information has been presented. If the CPU determines that the second information has not been presented yet (step 110: No), the CPU proceeds to step 112, which will be described later. On the other hand, if the CPU determines that the first information has been presented (110: Yes), the process proceeds to step 111.

When the CPU proceeds to step 111, the CPU controls the drive device and the like so that the own vehicle starts following the preceding vehicle PV. At this time, the CPU controls the drive device and the like so that the jerk J of the own vehicle matches the predetermined value Jc. The CPU then proceeds to step 115 and ends the execution of the program PR1.

When the CPU proceeds from step 110 to step 112, the CPU controls the notification device 50 to present the second information. The CPU then returns to step 106.

When the CPU proceeds from step 109 to step 113, it determines whether or not the accelerator pedal AP has been operated to start. When the CPU determines that the accelerator pedal AP has been operated to start the vehicle (113: Yes), the CPU proceeds to step 114. On the other hand, if the CPU does not determine that the accelerator pedal AP has been operated to start (113: No), the process returns to step 106.

When the CPU proceeds to step 114, the CPU controls the drive device and the like so that the own vehicle starts following the preceding vehicle PV. At this time, the CPU controls the drive device and the like so that the jerk J of the own vehicle matches the predetermined value Jd. The CPU then proceeds to step 115 and ends the execution of the program PR1.

Effect

Normally, if the driving support device 1 presents the first information and further presents the second information, there is a high possibility that the driver will pay attention to the road ahead (the second condition ($\theta \leq \theta$th) will be satisfied). Therefore, if the second condition is not satisfied even though the first information and the second information have been presented, the driving support device 1 estimates that the accuracy of detecting the angle θ by the in-vehicle camera 24 has decreased. When the driving support device 1 detects that the resume switch 27 has been operated after presenting the second information, the driving support device 1 estimates that "the driver intends to start the own vehicle" and starts the own vehicle. In this way, the driving support device 1 automatically uses the switch operation (second operation) as a trigger after executing two different modes of alerting the driver (presentation of first information and second information). Start the own vehicle. Therefore, compared to the case where the driving support device starts the own vehicle using the switch operation (first operation) as a trigger after executing one attention calling (presenting the first information), the estimation precision of the intention of the driver to start the own vehicle is high. According to the driving support device 1, even if the accuracy of detecting the angle θ by the in-vehicle camera 24 is degraded, the own vehicle can be started using a switch operation as a trigger.

The applicable embodiment is not limited to the above embodiment, and various modifications can be adopted within the scope of the present disclosure.

Variant

The driving support ECU 10 may be configured to start the own vehicle only when the elapsed time T from the first switch operation to the second switch operation is less than or equal to a threshold value Tth. If the elapsed time T exceeds the threshold value Tth, the driving support ECU 10 does not start the own vehicle even if the driver presses the resume switch 27 without looking ahead. Under this situation, when the driving support ECU 10 determines that the driver has focused on the road ahead, or that the driver has operated the accelerator pedal AP (starting operation or accelerator override) without paying attention to the road ahead, start the own vehicle.

What is claimed is:

1. A driving support device comprising:
    a forward sensor that acquires information related to behavior of a preceding vehicle;
    an operation sensor that acquires information related to an operation mode of an operation device of an own vehicle;
    a driver sensor that acquires information related to a direction to which a driver of the own vehicle is paying attention; and
    a processor that controls the own vehicle so as to start the own vehicle in a predetermined mode when a predetermined first condition to determine that the preceding vehicle has started is satisfied and operation of the operation device is detected, in a situation where the preceding vehicle has stopped and the own vehicle has stopped right behind the preceding vehicle, wherein
    the operation sensor includes a switch device, and
    the processor is configured to
        control a predetermined notification device and present predetermined first information to the driver, when a second condition to determine that the driver of the own vehicle was paying attention to an area forward of the own vehicle is not satisfied at a first time point when the first condition is satisfied,
        control the notification device and present second information to the driver, when operation of the switch device is detected without the second condition being satisfied after presenting the first information, and
        control the own vehicle so as to start the own vehicle in a predetermined first mode, when operation of the switch device is detected without the second condition being satisfied after presenting the second information.
2. The driving support device according to claim 1, wherein:
    the operation sensor includes an accelerator pedal sensor that detects depth of depression of an accelerator pedal; and
    the processor is configured to control the own vehicle so as to start the own vehicle in a predetermined second mode, when operation of the accelerator pedal is detected after presenting the first information to the driver.
3. The driving support device according to claim 1, wherein an attention calling level to the driver by presentation of the second information is higher than an attention calling level to the driver by presentation of the first information.
4. A driving support method comprising:
    a preceding vehicle information acquisition step of acquiring information related to behavior of a preceding vehicle;
    an operation information acquisition step of acquiring information related to an operation mode of an operation device of an own vehicle;
    a driver information acquisition step of acquiring information related to a direction to which a driver of the own vehicle is paying attention; and
    a start control step of controlling the own vehicle so as to start the own vehicle in a predetermined mode when a predetermined first condition to determine that the preceding vehicle has started is satisfied and operation of the operation device is detected, in a situation where the preceding vehicle has stopped and the own vehicle has stopped right behind the preceding vehicle, wherein
    the operation information acquisition step includes a step of acquiring operation information of a switch device as the operation device, and
    the start control step includes a step of
        controlling a predetermined notification device and presenting predetermined first information to the driver, when a second condition to determine that the driver of the own vehicle was paying attention to an area forward of the own vehicle is not satisfied at a first time point when the first condition is satisfied,
        controlling the notification device and presenting second information to the driver, when operation of the switch device is detected without the second condition being satisfied after presenting the first information, and
        controlling the own vehicle so as to start the own vehicle in a predetermined first mode, when operation of the switch device is detected without the second condition being satisfied after presenting the second information.
5. A non-transitory storage medium that stores a driving support program that causes a computer installed in an own vehicle to execute
    a preceding vehicle information acquisition step of acquiring information related to behavior of a preceding vehicle,
    an operation information acquisition step of acquiring information related to an operation mode of an operation device of the own vehicle,
    a driver information acquisition step of acquiring information related to a direction to which a driver of the own vehicle is paying attention, and
    a start control step of controlling the own vehicle so as to start the own vehicle in a predetermined mode when a predetermined first condition to determine that the preceding vehicle has started is satisfied and operation of the operation device is detected, in a situation where the preceding vehicle has stopped and the own vehicle has stopped right behind the preceding vehicle, wherein:
    the operation information acquisition step includes a step of acquiring operation information of a switch device as the operation device; and
    the start control step includes a step of
        controlling a predetermined notification device and presenting predetermined first information to the driver, when a second condition to determine that the driver of the own vehicle was paying attention to an area forward of the own vehicle is not satisfied at a first time point when the first condition is satisfied, controlling the notification device and presenting second information to the driver, when operation of the switch device is detected without the second condition being satisfied after presenting the first information, and controlling the own vehicle so as to start the own vehicle in a predetermined first mode, when operation of the switch device is detected without the second condition being satisfied after presenting the second information.

\* \* \* \* \*